US012458368B2

(12) United States Patent
Dhamankar

(10) Patent No.: US 12,458,368 B2
(45) Date of Patent: Nov. 4, 2025

(54) EXPANDABLE LOCKING REAMER WITH DOUBLE-SIDED BLADES

(71) Applicant: Zimmer, Inc., Warsaw, IN (US)

(72) Inventor: Akshay Vinayak Dhamankar, Parsippany, NJ (US)

(73) Assignee: Zimmer, Inc., Warsaw, IN (US)

( * ) Notice: Subject to any disclaimer, the term of this patent is extended or adjusted under 35 U.S.C. 154(b) by 418 days.

(21) Appl. No.: 17/949,892

(22) Filed: Sep. 21, 2022

(65) Prior Publication Data

US 2023/0131981 A1 Apr. 27, 2023

Related U.S. Application Data

(60) Provisional application No. 63/271,605, filed on Oct. 25, 2021.

(51) Int. Cl.
*A61B 17/16* (2006.01)

(52) U.S. Cl.
CPC ............... *A61B 17/1617* (2013.01)

(58) Field of Classification Search
CPC ... A61B 17/16; A61B 17/1617; A61B 17/164; A61B 2017/320074; A61B 2017/320075; A61B 2017/320077; A61B 17/320725
See application file for complete search history.

(56) References Cited

U.S. PATENT DOCUMENTS

| 6,383,188 | B2 * | 5/2002 | Kuslich | A61B 17/1617 606/80 |
| 10,456,145 | B2 * | 10/2019 | Laviano | A61B 17/1617 |
| 2001/0034526 | A1 | 10/2001 | Kuslich et al. | |
| 2011/0130760 | A1 | 6/2011 | Anderson et al. | |
| 2021/0298768 | A1 * | 9/2021 | Biton | A61B 17/1617 |
| 2021/0298783 | A1 * | 9/2021 | Shoshtaev | A61B 17/1617 |

* cited by examiner

*Primary Examiner* — Larry E Waggle, Jr.
(74) *Attorney, Agent, or Firm* — Schwegman Lundberg & Woessner, P.A.

(57) ABSTRACT

A reamer comprises a handle, a first shaft extending from the handle in a fixed manner, first and second pivoting blades connected to a distal end of the first shaft, a second shaft extending from the handle in a translatable manner, wherein the handle is rotatable to adjust a position between the first and second shafts to adjust a cutting diameter of the pivoting blades, and a locking mechanism to lock the pivoting blades into different cutting diameters. The pivoting blades can comprise double-sided blades. A method of reaming a bone with an expandable reamer comprises adjusting a cutting diameter of a cutting tip to a first diameter, locking the cutting tip at the first diameter, reaming a first diameter bore into the bone, unlocking the cutting tip, expanding the cutting diameter to a second diameter, relocking the cutting tip, and expanding the first diameter bore.

18 Claims, 8 Drawing Sheets

EXPANDABLE LOCKING REAMER WITH DOUBLE-SIDED BLADES

CLAIM OF PRIORITY

This application claims the benefit of U.S. Provisional Patent Application Ser. No. 63/271,605, filed on Oct. 25, 2021, the benefit of priority of which is claimed hereby, and which is incorporated by reference herein in its entirety.

TECHNICAL FIELD

This document pertains generally, but not by way of limitation, to devices and methods for performing arthroplasty procedures relating to the implantation of prosthetic devices or therapeutic materials. More specifically, but not by way of limitation, the present application relates to instruments used to remove bone matter to prepare a bone, such as a long bone, to receive one or more of a prosthetic implant, therapeutic material, biologic material and bone graft.

BACKGROUND

Orthopedic devices, such as prosthetic knee implants, can be used in various procedures to correct damaged or diseased joints. For example, total knee arthroplasty procedures involve implanting a prosthetic tibial component and a prosthetic femoral component to replace the articulating surfaces of the natural knee joint. As such, the prosthetic components comprise bearing surfaces against which another prosthetic component slides. In the case of a knee joint, the femoral component comprises prosthetic condyles that engage prosthetic bearings of the tibial component. The prosthetic components often include elongate a stabilization member, such as a stem or keel, that can extend into the intramedullary canal of the tibia or femur in order to stabilize the implant. Insertion of the elongate stabilization member can involve removal of cancellous bone from the intramedullary canal, as well as portions of the cortical bone extending along the cancellous bone. Because the cancellous and cortical composition of the bones of each particular patient is different, as well as the disease state of each bone being different, it can be desirable to remove different amounts of cortical bone to achieve the desired fit of the elongate stabilization member or remove necrotic (dead) or infected (dying) bone tissue to be replaced by bone graft and/or therapeutic material. For example, it is desirable for the elongate stabilization member to achieve a tight fit with the cortical bone to immobilize the prosthetic joint device. However, it is important to not remove excess cortical bone in order to preserve the strength of the bone. Thus, the surgeon performing the arthroplasty procedure typically reams progressively larger bone bores to achieve the desired diameter without removing too much cortical bone. This process can involve repeating the steps of reaming with a reamer, removal of the reamer and insertion of a larger reamer. This iterative reaming process, which relies on surgeon judgment, can increase the effort, time and expense of a surgical procedure.

Pub. No. US 2001/0034526A1 to Kuslich et al. is titled "Expandable Reamer" and Pub. No. US 2011/0130760A1 to Anderson et al. is titled "Instrument for Forming a Cavity."

Overview

The present inventor has recognized, among other things, that problems to be solved in performing surgical procedures using adjustable reamers involve the inability or difficulty of carefully controlling the reaming diameter. For example, some reamers can be adjusted, but the ability to control the reaming diameter can be difficult, which introduces the potential for over-reaming the intramedullary canal or cancellous bone tissue to a diameter or cancellous headspace larger than what is desired. The present subject matter can provide a solution to this and other problems, such as by providing a reamer that can be locked into various positions. In particular, the adjustable reamers of the present disclosure can be locked into a first reaming diameter to, for example, perform reaming of the initial bone bore, as can be made by a conventional bone drill. Subsequently, the reamer can be adjusted to expand the cutting blades to ream at progressively larger reaming diameters without having to remove the adjustable reamer from the bone. The cutting blades can be locked into a variety of different positions larger than the first position. Furthermore, the cutting blades can be locked into the first reaming diameter using a first side of the cutting blades by actuating the device in a first manner, and the cutting blades can be locked into the larger reaming diameters using a second side of the cutting blades by actuating the device in a second manner, thereby allowing the surgeon to readily know when the device is configured for initial reaming or enlarging reaming.

In an example, an expandable locking reamer comprises a handle, a first shaft extending distally from the handle along an axis in a fixed manner, a cutting tip comprising a first pivoting blade connected to a distal end of the first shaft and a second pivoting blade connected to the distal end of the first shaft, a second shaft extending distally from the handle along the axis in a translatable manner, wherein the handle is rotatable to adjust a position between the first shaft and the second shaft to adjust a cutting diameter of the first and second pivoting blades, and a locking mechanism to lock the first and second pivoting blades into a plurality of cutting diameters.

In another example, an expandable locking reamer comprising a handle, a first shaft extending distally from the handle along an axis in a fixed manner, a cutting tip comprising, a first pivoting blade connected to a distal end of the first shaft and a second pivoting blade connected to the distal end of the first shaft, wherein each of the first and second pivoting blades comprises a double-sided blade, and a second shaft extending distally from the handle along the axis in a translatable manner, wherein the handle is rotatable to adjust a position between the first shaft and the second shaft to adjust a cutting diameter of the first and second pivoting blades.

In another example, a method of reaming a bone comprises adjusting a cutting diameter of a cutting tip to a first diameter, locking the cutting tip at the first diameter, contacting the cutting tip to the bone, reaming a first diameter bore into the bone, unlocking the cutting tip, expanding the cutting diameter to a second diameter, relocking the cutting tip, and reaming the first diameter bore to form a second diameter bore in the bone.

This overview is intended to provide an overview of subject matter of the present patent application. It is not intended to provide an exclusive or exhaustive explanation of the invention. The detailed description is included to provide further information about the present patent application.

Figure 1A:
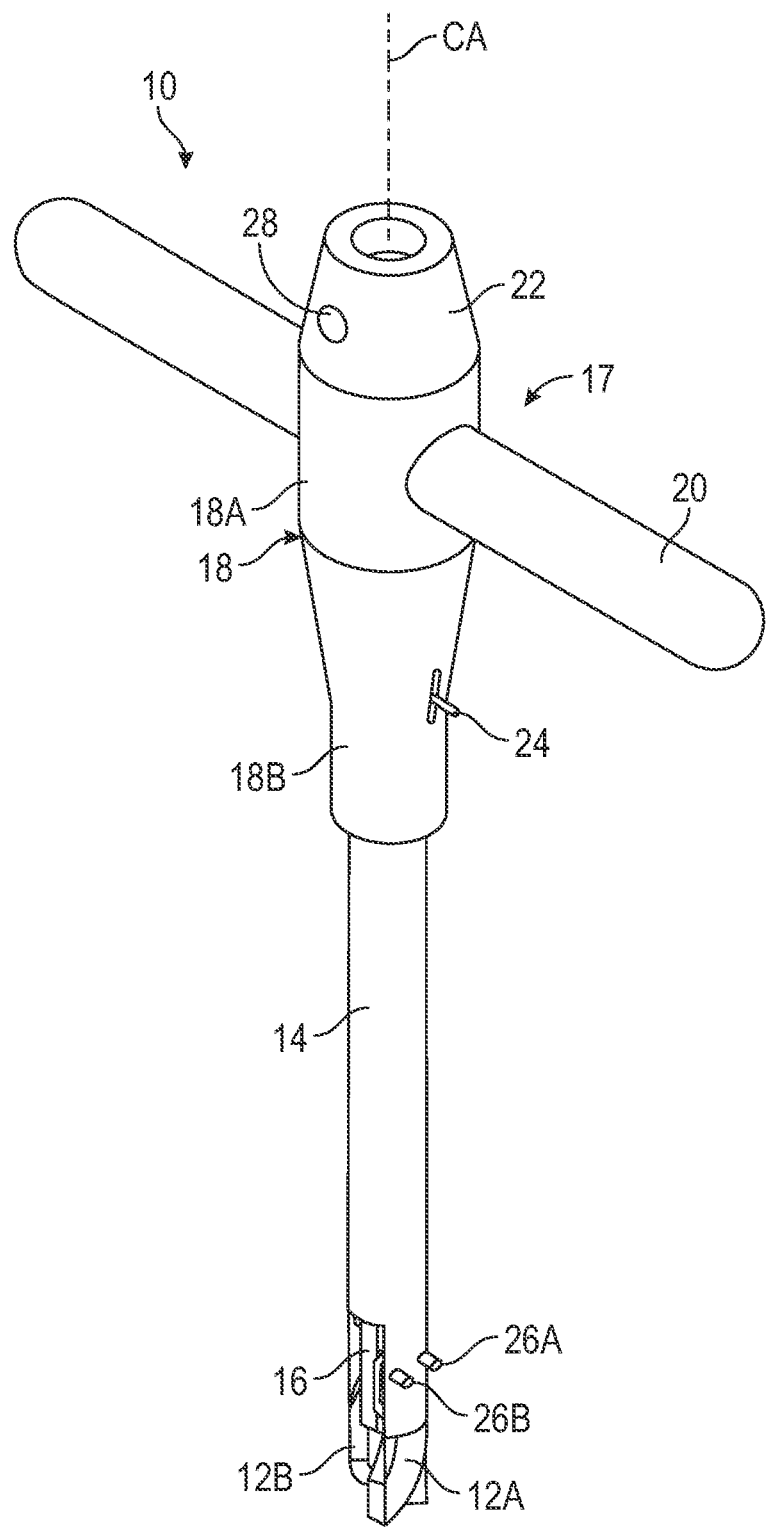
FIG. 1A is a perspective view of an expandable locking reamer of the present disclosure having first and second double-sided blades pivotable at a distal end of an outer sheath via an inner shaft.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1B:
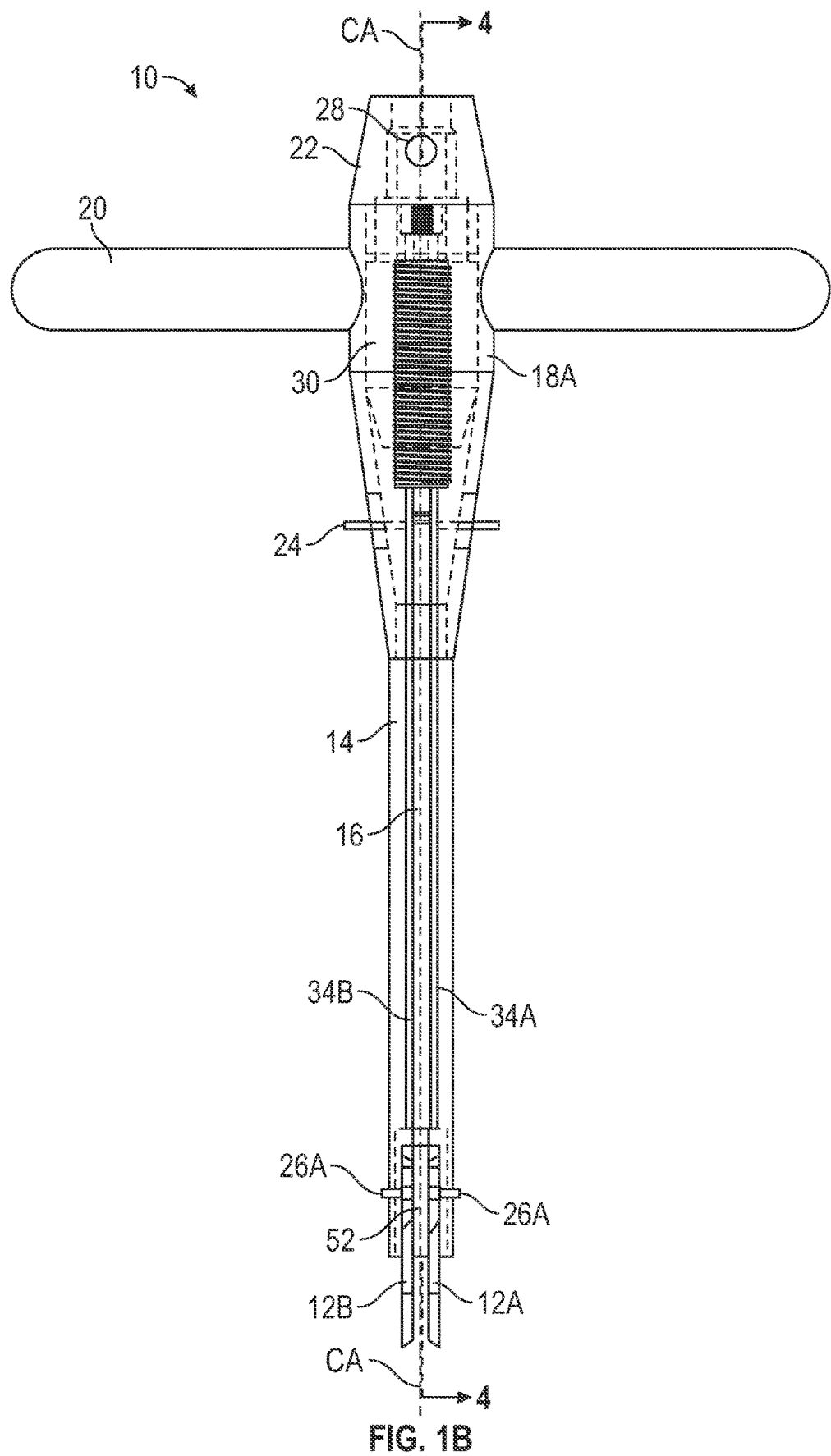
FIG. 1B is a side view of the expandable locking reamer of FIG. 1A showing internal components for actuating the first and second double-sided blades in phantom.

FIG. 1A is a perspective view of expandable locking reamer 10 of the present disclosure comprising first and second double-sided blades 12A and 12B pivotable at the end of outer sheath 14, inner shaft 16 and handle 17. Handle 17 can comprise outer cover 18, or sleeve, including upper portion 18A and lower portion 18B, lever 20, rotary dial locator 22 and compressive lock 24. Expandable locking reamer 10 can additionally comprise blade anchoring pins 26A and 26B and base anchor pin 28. FIG. 1B is a side view of expandable locking reamer 10 of FIG. 1A showing internal components (e.g., base thread locator 30 for actuating first and second double-sided blades 12A and 21B) in phantom. FIGS. 1A and 1B are discussed concurrently.

Figure 9:
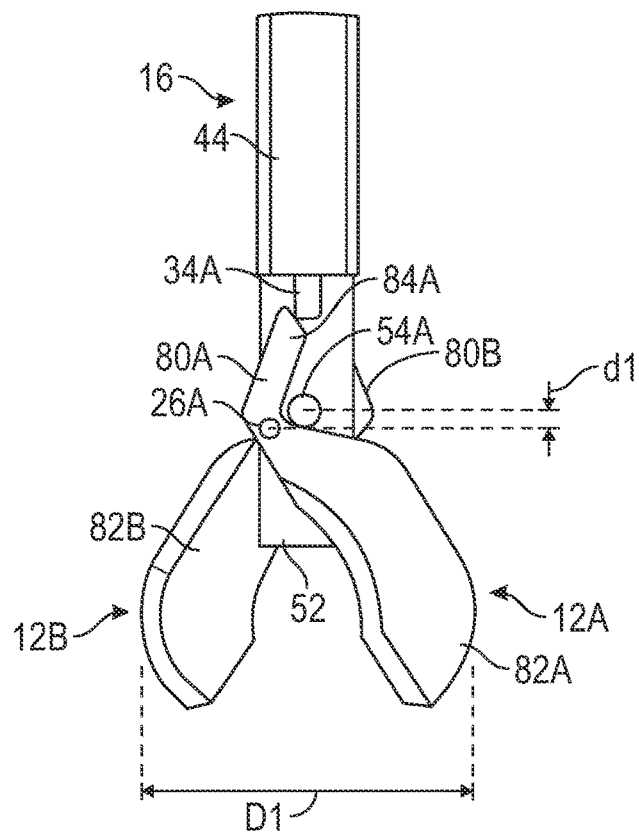
FIG. 9 is a first side view of the first and second double-sided blades locked in a narrow cutting configuration.
Figure 10:
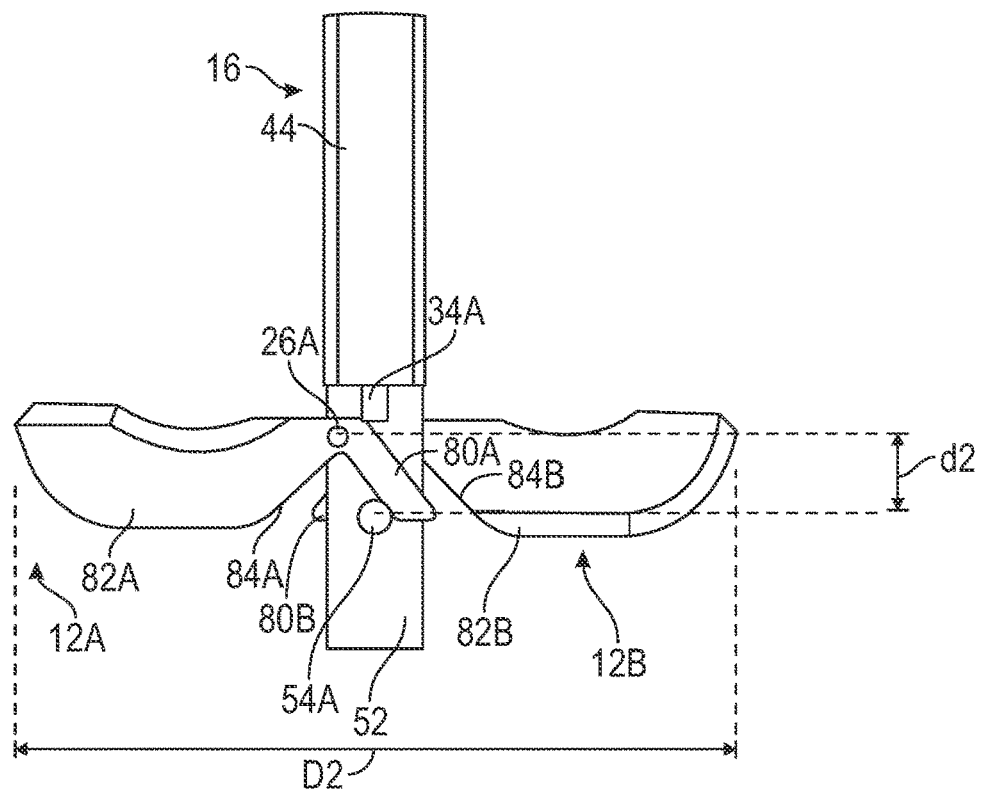
FIG. 10 is a first side view of the first and second double-sided blades locked in a wide cutting configuration.

Expandable locking reamer 10 can extend longitudinally along central axis CA. First and second double-sided blades 12A and 12B can comprise a cutting tip configured to expand relative to central axis CA to provide a variable cutting diameter. Rotary dial locator 22 can be rotated by a user to expand the cutting diameter of double-sided blades 12A and 12B. Rotatory dial locator 22 can be rotated in a first direction to position double-sided blades 12A and 12B to the narrow cutting diameter illustrated in FIG. 1A. Rotary dial locator 22 can be rotated in a second direction, opposite the first direction, to expand double-sided blades 12A and 12B to larger cutting diameters, as shown in FIGS. 9 and 10. Thus, expandable locking reamer 10 can be rotated by a surgeon in the configuration of FIG. 1A to ream a bore in a bone of a first diameter and rotary dial locator 22 can be rotated to allow the surgeon to increase the size of the bore as desired. Compressive lock 24 can comprise a locking mechanism used to hold first and second double-sided blades 12A and 12B in various positions selected by the surgeon.

As can be seen in FIG. 1B, and will be discussed in greater detail below, rotary dial locator 22 can be rotated to rotate base thread locator 30. Inner shaft 16 can be threaded into base thread locator 30 such that rotation of rotary dial locator 22 can cause axial translation of inner shaft 16. The distal end of inner shaft 16 to push against first and second double-sided blades 12A and 12B to change their rotational positioning relative to outer sheath 14. Compressive lock arms 34A and 34B of compressive lock 24 can be used to provide counter-rotational impediments or locks to rotational movement of first and second double-sided blades 12A and 12B. Compressive lock 24 can be selectively actuated by a user to allow first and second double-sided blades 12A and 12B to be adjusted by inner shaft 16.

Figure 2:
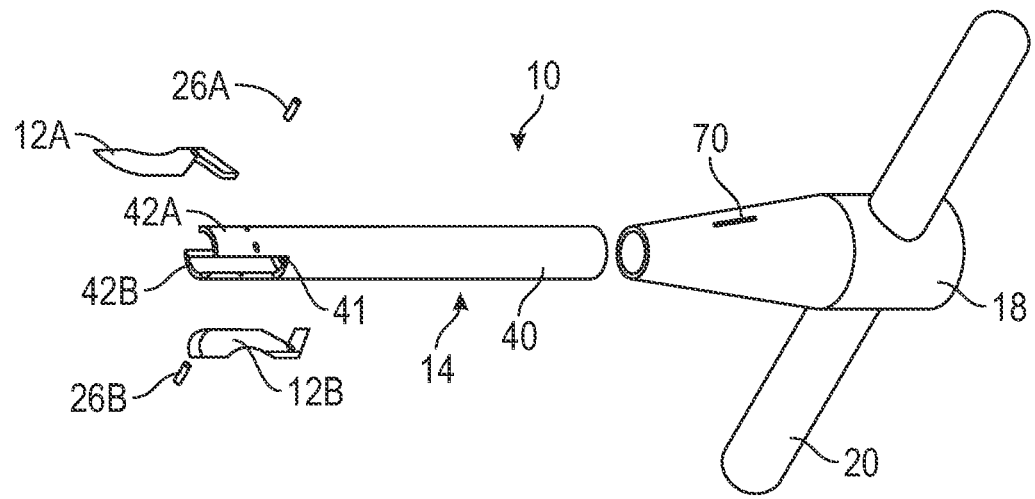
FIG. 2 is an exploded perspective view of the expandable locking reamer of FIGS. 1A and 1B showing a base thread locater, a compressive lock and the inner shaft.
Figure 2:
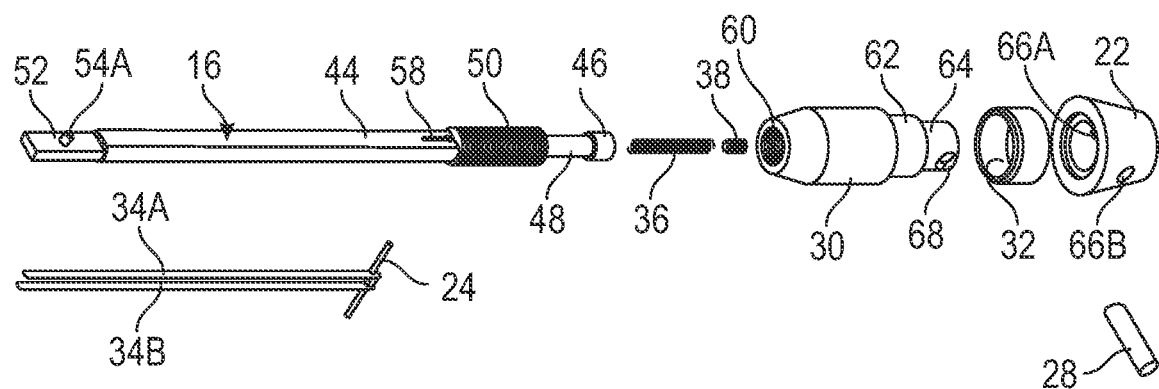

FIG. 2 is an exploded perspective view of expandable locking reamer 10 of FIG. 1A showing base thread locater 30, press fit ring 32, compressive lock arms 34A and 34B, and compressive lock spring 36. As discussed, expandable locking reamer 10 also comprises outer cover 18, lever 20, rotary dial locator 22, compressive lock 24, blade anchoring pins 26A and 26B and base anchor pin 28.

Outer sheath 14 can comprise an elongate shaft that extends along central axis CA (FIG. 1A). Outer sheath 14 can comprise cylindrical body 40 having internal passage 41 into which inner shaft 16 can be positioned. The distal end of cylindrical body 40 can include first and second prongs 42A and 42B to which first and second double-sided blades 12A and 12B can be mounted, respectively, using pins 26A and 26B. Pin 26A can extend between prongs 42A and 42B to mount double-sided blade 12A and pin 26B can extend between prongs 42A and 42B to mount double-sided blade 12B. Prongs 42A and 42B can include appropriate bores to receive pins 26A and 26B, such as with a force fit connection. The proximal end of cylindrical body 40 can engage with outer cover 18.

Inner shaft 16 can comprise elongate body 44 having a proximal end configured to be inserted into 30 and a distal end configured to be inserted into cylindrical body 40. The proximal end can include rim 46, necked-down portion 48 and threaded portion 50. The distal end can include slat 52 and first and second prongs 54A and 54B. Slat 52 can comprise a planar body that can slide longitudinally between first and second double-sided blades 12A and 12B. Prongs 54A and 54B can comprise bodies that project laterally from slat 52 to engage first and second double-sided blades 12A and 12B and induce or prohibit rotation. Elongate body 44 can extend between slat 52 and threaded portion 50 and can have a non-circular cross-section to engage with cylindrical body 40, also with a non-circular cross section, and outer cover 18 to prevent relative rotation therebetween. Elongate body 44 can include slot 58 that can receive compressive lock 24. Compressive lock 24 can comprise an elongate body, such as a rod or shaft, that connects compressive lock arms 34A and 34B and provides a lever or actuator for a user of expandable locking reamer 10 to actuate the locking mechanism. Slot 58 can extend in the longitudinal direction to allow compressive lock 24 a travel length for compressive lock 24.

Compressive lock spring 36 can be positioned within necked-down portion 48, such as within compartment 49 (FIGS. 4 and 5), and contained therein with spring stop 38.

Compressive lock arms 34A and 34B of compressive lock 24 can be positioned alongside the flat side faces of inner shaft 16 such that holes in each arm align with slot 58, thereby allowing compressive lock 24 to extend through both of arms 34A and 34B and slot 58. In additional examples, compressive lock arms 34A and 34B can slide within slots or tracks within elongate body 44.

Base thread locator 30 can include socket 60 that can be threaded onto threaded portion 50. Press fit ring 32 can be fit onto seat 62 of base thread locator 30. Rotary dial locator 22 can be fit onto seat 64 of base thread locator 30. Bores 66A and 66B in rotary dial locator 22 can be aligned with bore 68 in seat 68 such that pin 28 can be inserted therethrough, thereby connecting rotary dial locator 22 to base thread locator 30 and trapping press fit ring 32 therebetween.

Outer cover 18 can be slid over the distal end of inner shaft 16 to receive base thread locator 30 and abut rotary dial locator 22. Outer sheath 14 can be slid over the distal end of inner shaft 16 to engage outer cover 18. In examples, outer sheath 14 can be coupled to outer cover 18, such as via force fit connection, a threaded engagement or via bonding process such that relative rotation therebetween can be prevented or inhibited at final assembly. Compressive lock 24 can be inserted into slot 70 in outer cover 18 through the holes in compressive lock arms 34A and 34B and through slot 58.

As discussed in greater detail with reference to FIGS. 3, 4 and 5, compressive lock 24 can be retracted to allow rotary dial locator 22 to rotate to push double-sided blades 12A and 12B to different angular positions and then compressive lock 24 can be returned to engage double-sided blades 12A and 12B to react forces from tissue and bone during a reaming procedure.

Figure 3:
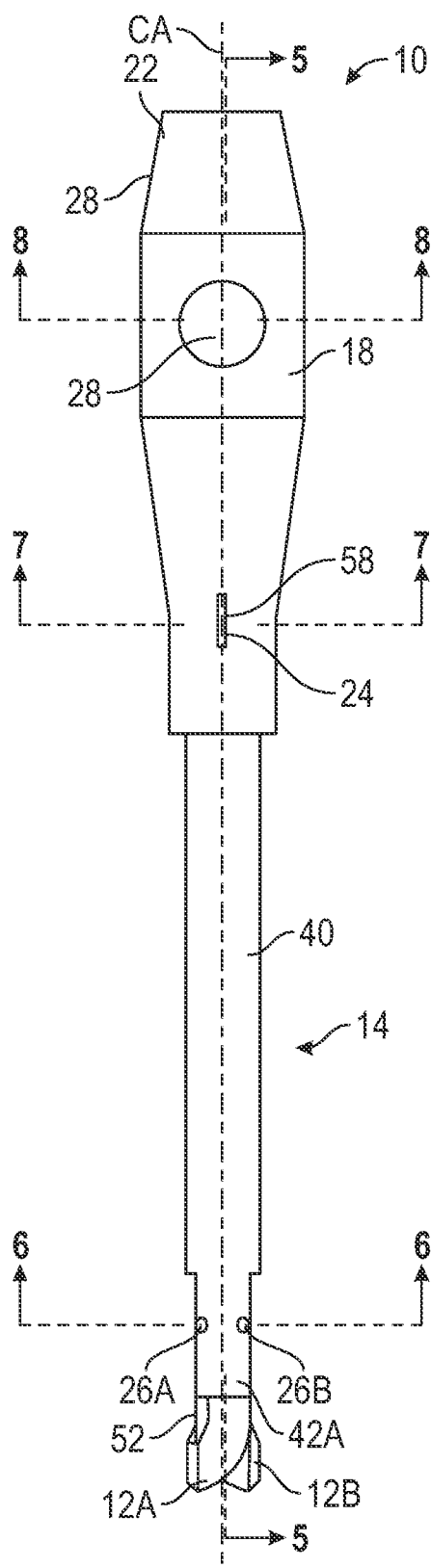
FIG. 3 is a first side view of the expandable locking reamer of FIGS. 1A and 1B showing the first and second double-sided blades extending from the outer sheath.
Figure 4:
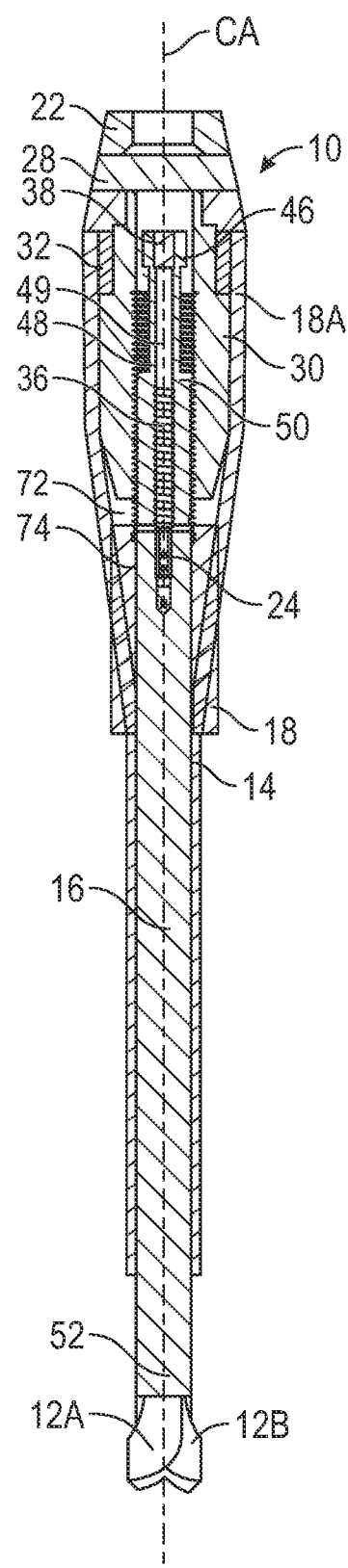
FIG. 4 is a first cross-sectional view of the locking reamer of FIG. 1B taken at section 4-4 to show the base thread locator located within an outer cover having a handle.

FIG. 3 is a first side view of expandable locking reamer 10 of FIGS. 1A and 1B showing first and second double-sided blades 12A and 12B extending from outer sheath 14. FIG. 4 is a first cross-sectional view of locking reamer 10 of FIG. 1B taken at section 4-4 to show base thread locator 30 located within outer cover 18 having lever 20. FIG. 5 is a second cross-sectional view of locking reamer 10 of FIG. 3 taken at section 5-5 to show lock spring 36 positioned between compressive lock 24 and spring stop 38. FIGS. 3, 4 and 5 are discussed concurrently.

Outer cover 18, outer sheath 14 and double-sided blades 12A and 12B can be rotated about central axis CA as a unit using lever 20 to perform reaming with expandable locking reamer 10. Rotary dial locator 22 can be rotated independent of outer cover 18, outer sheath 14 and double-sided blades 12A and 12B to cause rotation of double-sided blades 12A and 12B about pins 26A and 26B via movement of inner shaft 16, as is explained in greater detail with reference to FIGS. 9 and 10. Rotation of double-sided blades 12A and 12B about pins 26A and 26B can cause the cutting diameter of double-sided blades 12A and 12B to expand relative to central axis CA. Lock arms 34A and 34B can be biased downward by spring 36 to inhibit rotation of double-sided blades 12A and 12B opposite the rotation imparted by inner shaft 14. Lock arms 34A and 34B can be retracted by a user of expandable locking reamer 10 by the application of upward or proximal force to compressive lock 24.

Figure 5:
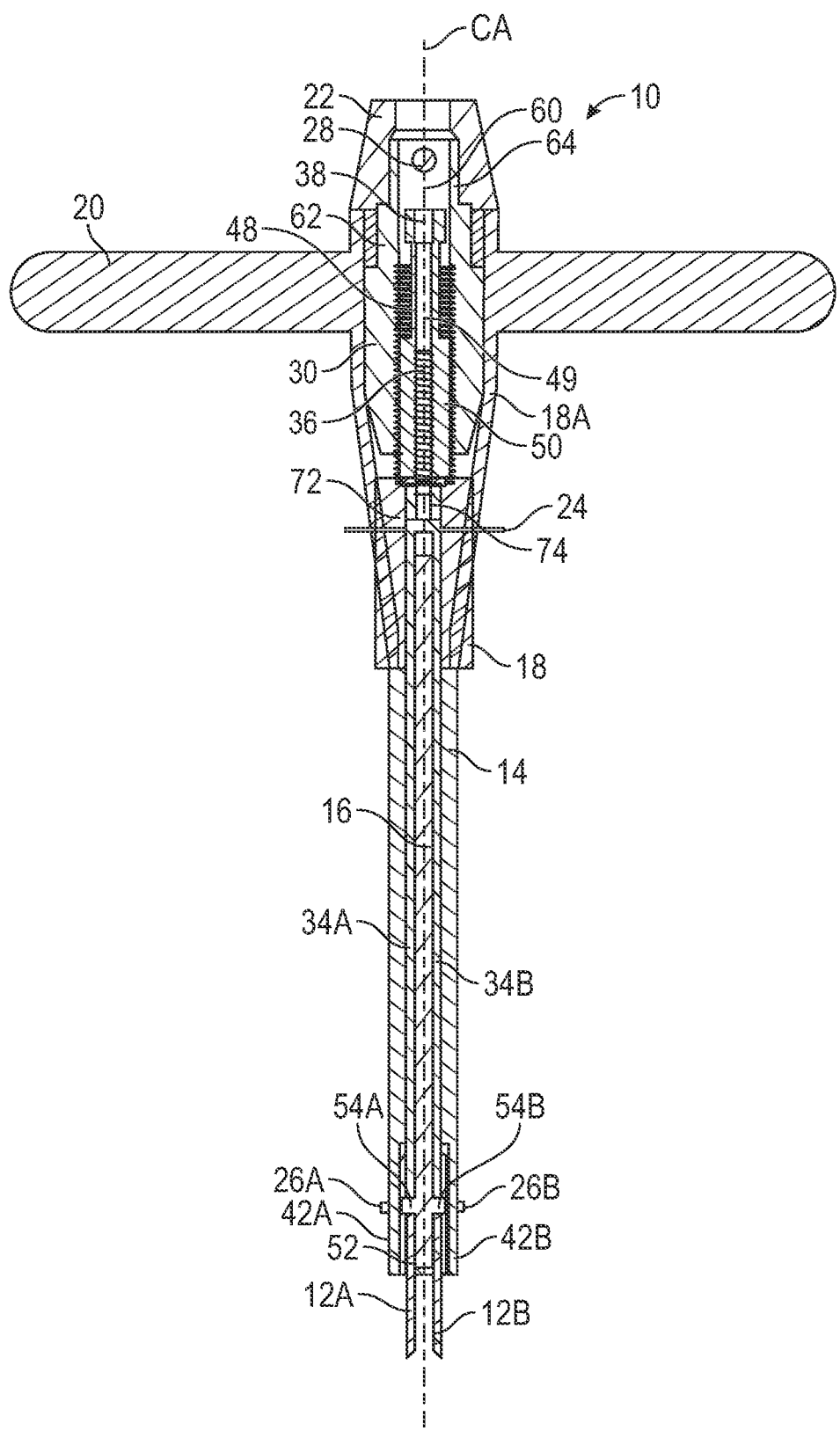
FIG. 5 is a second cross-sectional view of the locking reamer of FIG. 3 taken at section 5-5 to show a lock spring positioned between the compressive lock and a spring stop.

As can be seen with reference to FIG. 5, lever 20, outer cover 18 and outer sheath 14 can be fixedly attached to each other such that rotation between such components about central axis CA is not permitted. Thus, lever 20, outer cover 18 and outer sheath 14 can be arranged in a fixed rotational and longitudinal relationship. Rotary dial locator 22 can rotate about central axis CA relative to outer cover 18, but can remain longitudinally fixed relative to outer cover 18. 30 via pin 28. Pin 28 can transfer rotation of rotary dial locator 22 to base thread locator 30. Base thread locator 30 can rotate about central axis CA relative to outer cover 18, but can remain longitudinally fixed relative to outer cover 18. Press fit ring 32 can be trapped between rotary dial indicator 22 and base thread locator 30. Press fit ring 32 can have an inner diameter that is slightly larger than seat 62 to allow base thread locator 30. The outer diameter of press fit ring 32 can be slightly larger than an inner diameter pocket 72 within outer cover 18 to allow longitudinal immobilization of the assembly of press fit ring 32, base thread locator 30 and rotary dial locator 22.

Rotation of base thread locator 30 via coupling to rotary dial locator 22 can cause inner shaft 16 to move along central axis CA via threaded engagement between threaded portion 50 and socket 60. Inner shaft 16 can engage socket 74 in outer cover 18. Elongate body 44 and socket 74 can have complementary, non-circular cross-sections to prevent rotation of inner shaft 16 to facilitate the threaded engagement between threaded portion 50 and socket 60 generating longitudinal movement. Translation of inner shaft 16 distally, or downward with reference to the orientation of FIGS. 3-5 can cause slat 52 and prongs 54A and 54B to move distally. Prongs 54A and 54B can engage double-sided blades 12A and 12B to cause rotation.

Compressive lock 24 be longitudinally positioned along central axis CA along with inner shaft 16. However, compressive lock 24 can include a degree of longitudinal independence provided by the length of slot 58. As such, macro-movements of compressive lock 24 can be controlled by inner shaft 16 and micro-movements of compressive lock 24 can be controlled by slot 58. That is, spring 36 can bias compressive lock 24 downward against the bottom of slot 58. Thus, the longitudinal position of compressive lock 24 along central axis CA will be controlled by movement of inner shaft 16. However, for any longitudinal position of inner shaft 16, compressive lock 24 can be moved upward within slot 58 by compression of spring 36 via a user.

Figure 6:
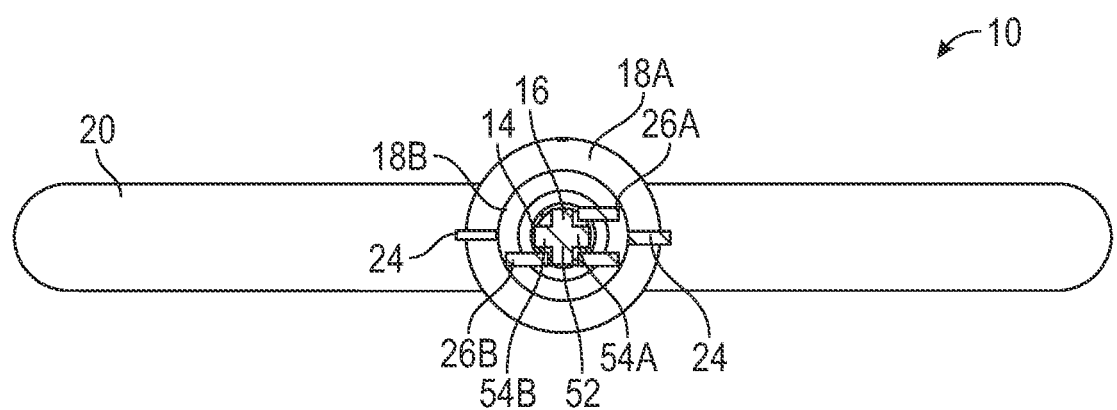
FIGS. 6, 7 and 8 are cross-sectional views of the locking reamer of FIG. 3 showing blade anchoring pins, the compressive lock and the inner shaft in the base thread locator, respectively.
Figure 7:
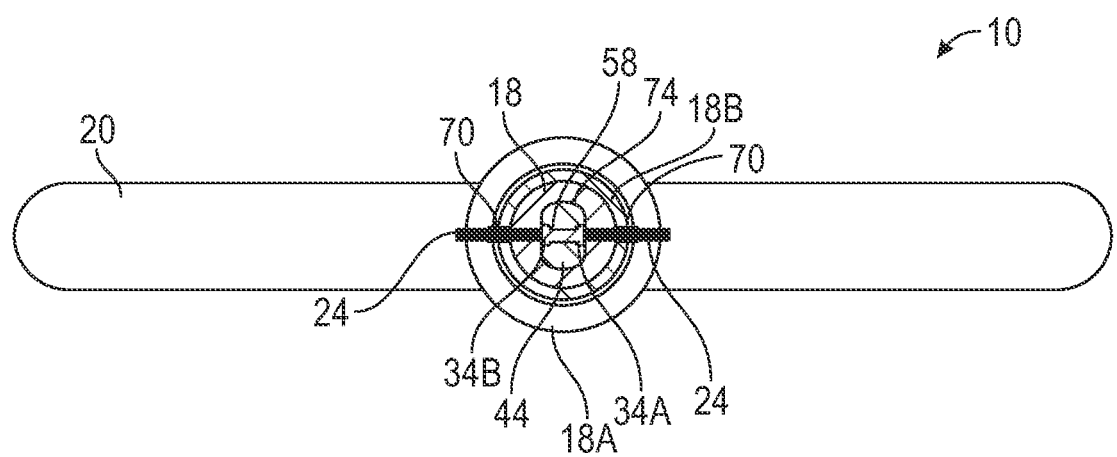
Figure 8:
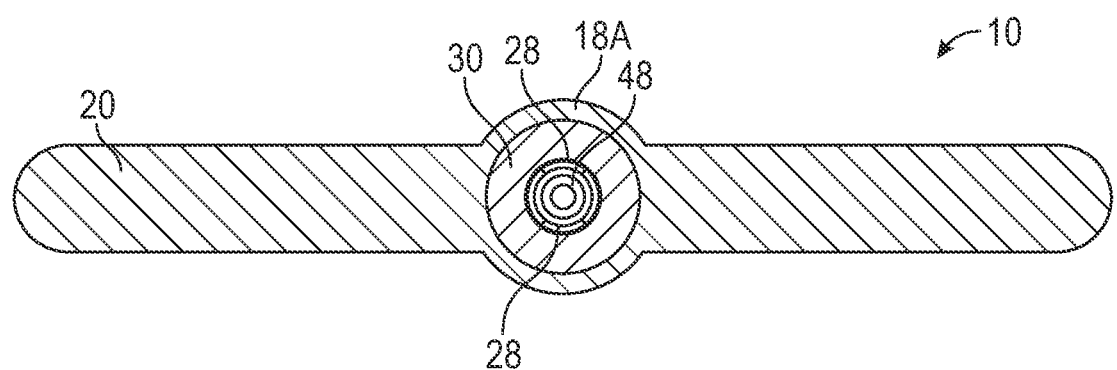

FIGS. 6, 7 and 8 are cross-sectional views of locking reamer 10 of FIG. 3 showing blade anchoring pins 26A and 26B, compressive lock 24 and inner shaft 16 in base thread locator 30, respectively.

As can be seen in FIG. 8, necked-down portion 48 of inner shaft 16 can be located concentrically within base thread locator 30. Base thread locator 30 can be located concentrically within upper portion 18A of outer cover 18. Pin 28 can extend through base thread locator 30 transverse to lever 20. Necked-down portion 48 can rotate within base thread locator 30 via threaded engagement, as discussed above. Base thread locator 30 can rotate within pocket 72 of outer cover 18 via connection of press fit ring 32, as discussed above.

As can be seen in FIG. 7, the wider, upper portion 18A of outer cover 18 can be seen distally of a cross-section through the narrower, lower portion 18B of outer cover 18. Elongate body 44 of inner shaft 16 is shown within socket 74 outer cover 18 in cross-section. Compressive lock 24 is shown extending through slots 70 in outer cover 18 and slot 58 in elongate body 44 of inner shaft 16. Lock arms 34A and 34B can be seen connected to compressive lock 24 and extend out of the plane of FIG. 7. As can be seen, socket 74 and elongate body 44 have complementary cross-sections to prevent rotation of elongate body 44 within socket 74.

As can be seen in FIG. 6, upper portion 18A and lower portion 18B of outer cover 18 can be seen behind inner shaft 16 and outer sleeve 14. Inner sleeve 16 and outer sleeve 14 are shown in cross-section. Pins 26A and 26B can extend across outer sheath 14 prior to final assembly to facilitate mounting of double-sided blades 12A and 12B (not visible in FIG. 6) and then can be made flush with the outer surface of outer sleeve 14, e.g., by grinding or trimming, to provide a smooth exterior cylindrical surface on outer sleeve 14. Slat 52 can be positioned between double-sided blades 12A and 12B and prongs 54A and 54B can extend therefrom. As discussed herein, prongs 54A and 54B can be moved proximally and distally by movement of inner shaft 16 to cause radially outward or inward rotation of double-sided blades 12A and 12B.

FIG. 9 is a first side view of the first and second double-sided blades 12A and 12B locked in a narrow cutting configuration, relative to the wider cutting configuration of FIG. 10. FIG. 9 shows a first expansion of double-sided blades 12A and 12B from the narrowest configuration of FIGS. 3 and 4. FIG. 10 is a first side view of first and second double-sided blades 12A and 12B locked in a wide cutting configuration. FIG. 10 shows a second expansion of double-sided blades 12A And 12B from the narrowest configuration of FIGS. 3 and 4.

First double-sided blade 12A can be mounted to outer sheath 14 (omitted from FIG. 9 for clarity) via pin 26A. Second double-sided blade 12B can be mounted to the opposite side of outer sheath 14 via pin 26A (FIG. 1A). Slat 52 of inner shaft 16 can be positioned between first and second double-sided blades 12A and 12B.

First prong 54A can extend from slat 52 to engage first double-sided blade 12A. As can be seen in FIGS. 1B and 5, second prong 54B can extend from slat 52 to engage second double-sided blade 12B. Elongate body 44 of inner shaft 16 can extend proximally from first and second double-sided blades 12A and 12B. First lock arm 34A can extend parallel to elongate body 44 to engage first double-sided blade 12A. As can be seen in FIGS. 1B and 5, second lock arm 34B can extend parallel to elongate body 44 to engage second double-sided blade 12B. In examples, first and second lock arms 34A and 34B can extend through elongate body 44 such that distal tips of first and second lock arms 34A and 34B protrude therefrom alongside slat 52.

First double-sided blade 12A can include actuation portion 80A and cutting portion 82A. Second double-sided blade 12B can include actuation portion 80B and cutting portion 82B. First and second double-sided blades 12A and 12B, as well as pins 26A and 26B, can be fixed longitudinally in FIG. 9 with respect to central axis CA via coupling to outer sheath 14, as shown in FIG. 5. However, elongate body 44 can be configured to move proximally and distally along central axis CA, as explained above with reference to FIGS. 3-5, by operation of rotary dial locator 22, and compressive lock arms 34A and 34B can be configured to move proximally and distally along central axis CA, as explained above with reference to FIGS. 3-5, by operation of compressive lock 24. Compressive lock arms 34A and 34B can be biased in the distal direction (downward with reference to the orientation of FIG. 9) by compressive spring 36 (FIG. 2). Elongate body 44 can be moved proximally and distally to engage prongs 54A and 54B with first and second double-sided blades 12A and 12B in notches 84A and 84B between actuation portion 80A and cutting portion 82A and actuation portion 80B and cutting portion 82B, respectively. Thus, as inner shaft 16 is moved, prongs 54A and 54B can push against first and second double-sided blades 12A and 12B to cause rotation about pins 26A and 26B. As shown in FIG. 9, prong 54A can prevent counter-clockwise rotation of first double-sided blade 12A. Similarly, prong 54B can prevent clockwise rotation of second double-sided blade 12B.

Compressive lock 24 can be biased downward to engage first and second double-sided blades 12A and 12B. First compressive lock arm 34A can engage first double-sided blade 12A at first actuation portion 80A to prevent clockwise rotation of first double-sided blade 12A. Similarly, second compressive lock arm 34B can engage second double-sided blade 12B at second actuation portion 80B to prevent counter-clockwise rotation of second double-sided blade 12B.

As such, compressive lock 24 can lock first and second double-sided blades 12A and 12B into rotational positions on pins 26A and 26B relative to outer sheath 14. In order to reposition first and second double-sided blades 12A and 12B, compressive lock 24 can be moved proximally to withdraw engagement of lock arms 34A and 34B with actuation portions 80A and 80B. Thus, inner shaft 16 can be freely moved along central axis CA to push against either actuation portions 80A and 80B or cutting portions 82A and 82B.

As can be seen in FIG. 9, prongs 54A and 54B can be located distance d1 above pins 26A and 26B to generate a cutting diameter D1, with lock arms 34A and 34B engaging outer side 92B (FIGS. 11A-11C) of actuation portions 80A. In the orientation of FIGS. 3 and 4, prongs 54A and 54B can be moved to so that distance d1 is equal to zero, with lock arms 34A and 34B engaging top side 92A (FIGS. 11A-11C) of actuation portions 80A. As can be seen in FIG. 10, prongs 54A and 54B can be located distance d2 below pins 26A and 26B to generate a cutting diameter D2, with lock arms 34A and 34B engaging bottom side 92C of actuation portions 80A.

Thus, with lock arms 34A and 34B retracted away from actuation portions 80A, prongs 54A and 54B can be moved proximally and distally relative to pins 26A and 26B to rotate double-sided blades 12A and 12B into an almost infinite number of positions to vary the cutting diameter illustrated by D1 and D2.

Figure 11C:
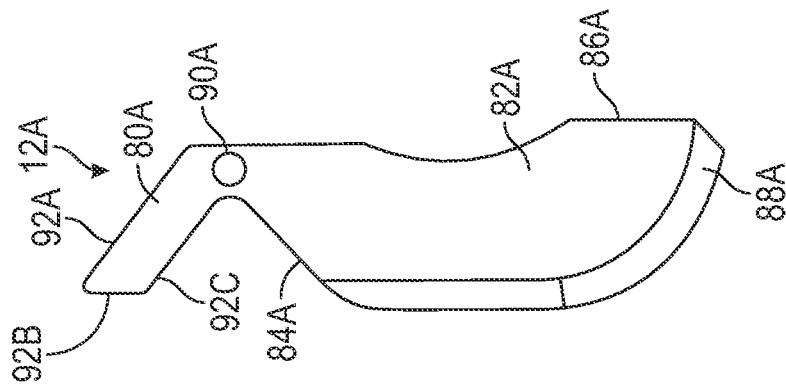
FIGS. 11A, 11B and 11C are first side, front and second side views of a double-sided blade of the present disclosure.
Figure 11B:
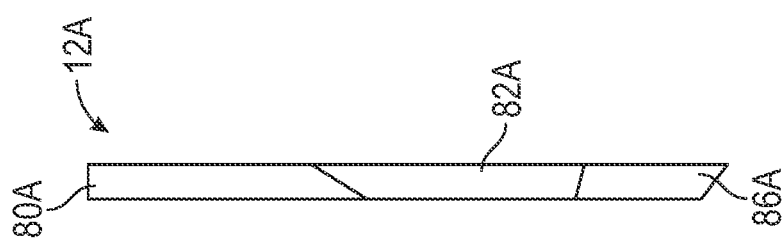
Figure 11A:
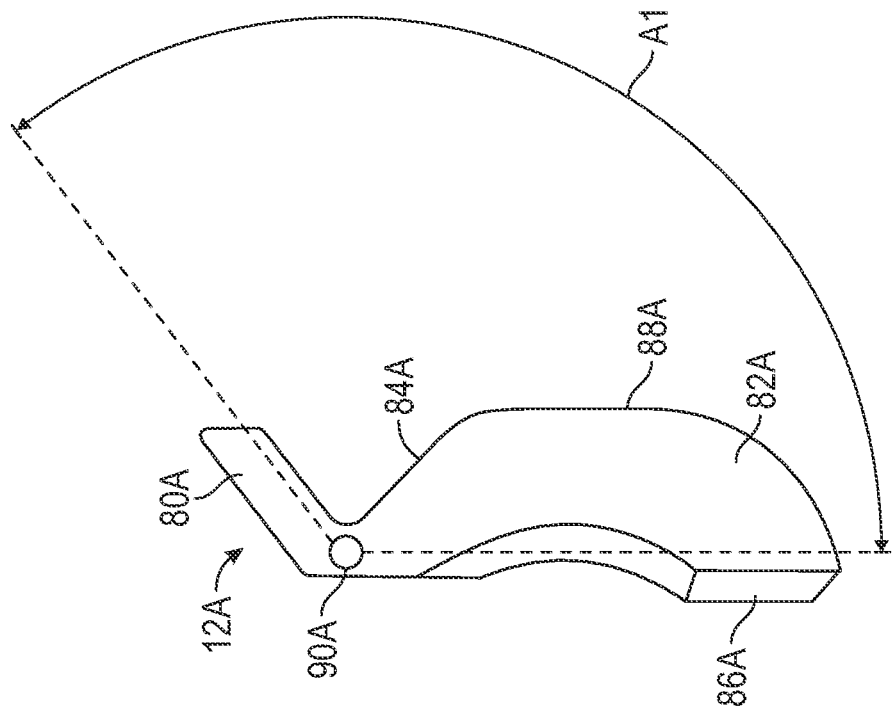

FIGS. 11A, 11B and 11C are first side, front and second side views of double-sided blade 12A of the present disclosure. Double-sided blade 12A can comprise actuation portion 80A, cutting portion 82A, notch 84A, first cutting edge 86A, second cutting edge 88A and bore 90A. Actuation portion 80A can comprise top side 92A, outer side 92B and bottom side 92C. Angle A1 can be formed between actuation portion 80A and cutting portion 82A. Double-sided blade 12B can be configured in a similar manner.

Cutting portion 82A can comprise an arcuate blade portion wherein first cutting edge 86A comprises an outer edge and second cutting edge 88A comprises an inner edge. In examples, angle A1 can be in the range of about forty degrees to about 50 degrees. Thus, lock arms 34A and 34B can be configured to engage top side 92A, outer side 92B and bottom side 92C to position first cutting edges 86A on double-sided blades 12A and 12B as close together as possible to ream the narrowest bore possible for reamer 10 or to allow double-sided blades 12A and 12B to be rotated far apart to allow second cutting edges 88A on double-sided blades 12A and 12B to ream the largest bore possible for reamer 10.

Expandable locking reamer 10 can be used to ream a bone canal into a long bone, such as a femur, tibia or humerus. The reamed bone canal can be an expansion of an intramedullary canal. Double-sided blades 12A and 12B can be configured to cut through cortical and cancellous bone. In examples, a pilot hole can be reamed or drilled into the bone with double-sided blades 12A and 12B in their narrowest cutting configuration, as shown in FIGS. 3 and 4. In such a configuration, first cutting edge 86A can be used to cut bone. Thus, the distal tips of double-sided blades 12A and 12B can engage a rim of the pilot hole in the cortical bone. A surgeon can grasp cover 18 to hold expandable locking reamer 10 in place. Lever 20 can be rotated to rotate expandable locking reamer 10 about central axis CA to ream the bone canal to a first diameter. Compressive lock 24 can be retracted in a proximal direction to unlock double-sided blades 12A and 12B. Rotary dial locator 22 can be rotated to expand double-sided blades 12A and 12B to a larger cutting diameter. A hash mark on rotary dial locator 22 can be aligned with graduated marks on cover 18 to select a reaming diameter. The graduated marks can correspond to different cutting diameters of double-sided blades 12A and 12B. Compressive lock 24 can be released to lock double-sided blades 12A and 12B. Thus, the bone canal can be reamed at a larger diameter than before.

The systems, devices and methods discussed in the present application can be useful in performing reaming operations of an intramedullary canal of a long bone. The present disclosure describes an expandable reamer that can be locked into a plurality of different reaming diameters such that the surgeon does not have to remove the reamer from the bone to enlarge a reamed bone canal or have to use a plurality of different sized reamers. The expandable locking reamer can be readily operated to put the expandable locking reamer into its smallest cutting diameter, to thereby ensure a safe, minimally invasive first ream. Thereafter, the reamer can be gradually expanded by manipulation in a different or opposite manner as was used to put the expandable locking reamer in the initial or smallest reaming configuration. As such, the surgeon can carefully control the finally reamed diameter of the bone canal, while minimizing risk of removing excess cortical bone that might unnecessarily weaken the bone.

VARIOUS NOTES & EXAMPLES

Example 1 is an expandable locking reamer comprising: a handle; a first shaft extending distally from the handle along an axis in a fixed manner; a cutting tip comprising: a first pivoting blade connected to a distal end of the first shaft; and a second pivoting blade connected to the distal end of the first shaft; a second shaft extending distally from the handle along the axis in a translatable manner, wherein the handle is rotatable to adjust a position between the first shaft and the second shaft to adjust a cutting diameter of the first and second pivoting blades; and a locking mechanism to lock the first and second pivoting blades into a plurality of cutting diameters.

In Example 2, the subject matter of Example 1 optionally includes wherein the locking mechanism comprises: an elongate lock body extending from the handle to engage the first and second pivoting blades to prevent rotation.

In Example 3, the subject matter of Example 2 optionally includes wherein the locking mechanism further comprises: a spring configured to bias the elongate lock body into a distal position; and an actuation lever extending from the elongate lock body to permit manual deactivation of the locking mechanism.

In Example 4, the subject matter of any one or more of Examples 2-3 optionally include wherein each of the first and second pivoting blades comprises: an actuator portion; and an arcuate blade portion comprising: an inner edge; and an outer edge.

In Example 5, the subject matter of Example 4 optionally includes wherein: the arcuate blade portion extends along a blade axis from a distal end to a proximal end; and the actuator portion extends relative to the blade axis at an angle in the range of forty to fifty degrees.

In Example 6, the subject matter of any one or more of Examples 4-5 optionally include wherein the actuator portion comprises a plurality of facets configured to engage the elongate lock body at different rotational positions of the first and second pivoting blades.

In Example 7, the subject matter of Example 6 optionally includes wherein: the elongate lock body comprises: a first arm extending along a first side of the second shaft; and a second arm extending along a second side of the second shaft; the first pivoting blade is pivotably connected to a first side of the first shaft facing the first side of the second shaft and the second pivoting blade is pivotably connected to a second side of the first shaft facing the second side of the second shaft.

In Example 8, the subject matter of any one or more of Examples 1-7 optionally include wherein the handle further comprises a locator into which the second shaft is threaded.

In Example 9, the subject matter of Example 8 optionally includes wherein the handle further comprising knob connected to the locator to rotate the locator and cause longitudinal movement of the second shaft.

In Example 10, the subject matter of Example 9 optionally includes wherein: the second shaft is threaded into the locator; and the second shaft is disposed concentrically inside the first shaft.

In Example 11, the subject matter of any one or more of Examples 9-10 optionally include wherein the handle further comprises: a sleeve rotatable relative to the locator; and a cross-piece extending from the sleeve to facilitate rotation of the expandable locking reamer to perform reaming.

Example 12 is an expandable locking reamer comprising: a handle; a first shaft extending distally from the handle along an axis in a fixed manner; a cutting tip comprising: a first pivoting blade connected to a distal end of the first shaft; and a second pivoting blade connected to the distal end of the first shaft; wherein each of the first and second pivoting blades comprises a double-sided blade; and a second shaft extending distally from the handle along the axis in a translatable manner, wherein the handle is rotatable to adjust a position between the first shaft and the second shaft to adjust a cutting diameter of the first and second pivoting blades.

In Example 13, the subject matter of Example 12 optionally includes a locking mechanism to lock the first and second pivoting blades into a plurality of rotational positions.

In Example 14, the subject matter of Example 13 optionally includes a proximal knob to threadably push or pull the second shaft relative to the first shaft.

In Example 15, the subject matter of Example 14 optionally includes wherein: the locking mechanism is configured to prevent rotation of the first and second pivoting blades is a first direction; and the second shaft is configured to prevent rotation of the first and second pivoting blades in a second direction.

In Example 16, the subject matter of any one or more of Examples 12-15 optionally include wherein each of the first and second pivoting blades comprises: an actuator portion; and an arcuate blade portion comprising: an inner edge; and an outer edge.

Example 17 is a method of reaming a bone, the method comprising: adjusting a cutting diameter of a cutting tip to a first diameter; locking the cutting tip at the first diameter; contacting the cutting tip to the bone; reaming a first diameter bore into the bone; unlocking the cutting tip; expanding the cutting diameter to a second diameter; relocking the cutting tip; and reaming the first diameter bore to form a second diameter bore in the bone.

In Example 18, the subject matter of Example 17 optionally includes wherein adjusting cutting diameter of a cutting tip comprises adjusting an angular position between a pair of double-sided cutting blades.

In Example 19, the subject matter of Example 18 optionally includes wherein locking the cutting tip at the first diameter comprises engaging a spring-loaded locking mechanism to prevent counter-rotation of the pair of double-sided cutting blades.

In Example 20, the subject matter of any one or more of Examples 18-19 optionally include wherein expanding the cutting diameter to a second diameter comprises repositioning the pair of double-sided cutting blades to cut with first outer edges to second inner edges.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. An expandable locking reamer comprising:
   a handle;
   a first shaft extending distally from the handle along an axis in a fixed manner;
   a cutting tip comprising:
      a first pivoting blade connected to a distal end of the first shaft; and
      a second pivoting blade connected to the distal end of the first shaft,
   a second shaft extending distally from the handle along the axis in a translatable manner, wherein the handle is rotatable to adjust a position between the first shaft and the second shaft to adjust a cutting diameter of the first and second pivoting blades; and
   a locking mechanism to lock the first and second pivoting blades into a plurality of cutting diameters, wherein the locking mechanism comprises an elongate lock body extending from the handle to engage the first and second pivoting blades to prevent rotation.

2. The expandable locking reamer of claim 1, wherein the locking mechanism further comprises:
   a spring configured to bias the elongate lock body into a distal position; and
   an actuation lever extending from the elongate lock body to permit manual deactivation of the locking mechanism.

3. The expandable locking reamer of claim 1, wherein each of the first and second pivoting blades comprises:
   an actuator portion; and
   an arcuate blade portion comprising:
      an inner edge; and
      an outer edge.

4. The expandable locking reamer of claim 3, wherein:
   the arcuate blade portion extends along a blade axis from a distal end to a proximal end; and
   the actuator portion extends relative to the blade axis at an angle in a range of forty to fifty degrees.

5. The expandable locking reamer of claim 3, wherein the actuator portion comprises a plurality of facets configured to engage the elongate lock body at different rotational positions of the first and second pivoting blades.

6. The expandable locking reamer of claim 5, wherein:
   the elongate lock body comprises:
      a first arm extending along a first side of the second shaft; and
      a second arm extending along a second side of the second shaft;
   the first pivoting blade is pivotably connected to a first side of the first shaft facing the first side of the second shaft; and
   the second pivoting blade is pivotably connected to a second side of the first shaft facing the second side of the second shaft.

7. The expandable locking reamer of claim 1, wherein the handle further comprises a locator into which the second shaft is threaded.

8. The expandable locking reamer of claim 7, wherein the locater is configured to be rotated to cause longitudinal movement of the second shaft.

9. The expandable locking reamer of claim 8, wherein:
the second shaft is threaded into the locator; and
the second shaft is disposed concentrically inside the first shaft.

10. The expandable locking reamer of claim 8, wherein the handle further comprises:
a sleeve rotatable relative to the locator; and
a cross-piece extending from the sleeve to facilitate rotation of the expandable locking reamer to perform reaming.

11. A method of reaming a bone, the method comprising:
adjusting a cutting diameter of a cutting tip to a first diameter by adjusting a position of a second shaft within a first shaft;
locking the cutting tip at the first diameter with one or more of axially slidable locking arms slidable between the first shaft and the second shaft;
contacting the cutting tip to the bone;
reaming a first diameter bore into the bone;
unlocking the cutting tip by retracting the one or more axially slidable locking arms;
expanding the cutting diameter to a second diameter by repositioning the second shaft relative to the first shaft;
relocking the cutting tip by repositioning the one or more axially slidable locking arms; and
reaming the first diameter bore to form a second diameter bore in the bone.

12. The method of claim 11, wherein adjusting a cutting diameter of a cutting tip comprises adjusting an angular position between a pair of double-sided cutting blades.

13. The method of claim 12, wherein locking the cutting tip at the first diameter further comprises biasing the one or more axially slidable locking arms to prevent counter-rotation of the pair of double-sided cutting blades.

14. The method of claim 12, wherein expanding the cutting diameter to a second diameter comprises repositioning the pair of double-sided cutting blades to cut with first outer edges to second inner edges.

15. An expandable locking reamer comprising:
a handle comprising a locator;
a first shaft extending distally from the handle along an axis in a fixed manner;
a cutting tip comprising:
a first pivoting blade connected to a distal end of the first shaft; and
a second pivoting blade connected to the distal end of the first shaft;
a second shaft extending distally from the handle and threaded into the locator along the axis in a translatable manner, wherein the handle is rotatable to adjust a position between the first shaft and the second shaft to adjust a cutting diameter of the first and second pivoting blades; and
a locking mechanism to lock the first and second pivoting blades into a plurality of cutting diameters;
wherein the locater is configured to be rotated to cause longitudinal movement of the second shaft.

16. The expandable locking reamer of claim 15, wherein:
the second shaft is disposed concentrically inside the first shaft.

17. The expandable locking reamer of claim 15, wherein the handle further comprises:
a sleeve rotatable relative to the locator; and
a cross-piece extending from the sleeve to facilitate rotation of the expandable locking reamer to perform reaming.

18. The expandable locking reamer of claim 15, wherein each of the first and second pivoting blades comprises:
an actuator portion; and
an arcuate blade portion comprising:
an inner edge; and
an outer edge.

\* \* \* \* \*